United States Patent
Tian et al.

(10) Patent No.: US 8,446,694 B1
(45) Date of Patent: May 21, 2013

(54) DISK DRIVE HEAD SUSPENSION ASSEMBLY WITH EMBEDDED IN-PLANE ACTUATOR AT FLEXURE TONGUE

(71) Applicant: Western Digitial Technologies, Inc., Irvine, CA (US)

(72) Inventors: Jifang Tian, Fremont, CA (US); Jian Yang, Fremont, CA (US); Qiang Yang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/626,846

(22) Filed: Sep. 25, 2012

Related U.S. Application Data

(63) Continuation-in-part of application No. 13/159,598, filed on Jun. 14, 2011, now Pat. No. 8,295,012.

(51) Int. Cl.
*G11B 5/48* (2006.01)

(52) U.S. Cl.
USPC .......................................................... 360/245

(58) Field of Classification Search .................. 360/245, 360/245.7, 245.4, 245.9, 245.2, 234.5, 294, 360/294.4, 244.2, 244.3, 234.6, 244.5
See application file for complete search history.

(56) References Cited

U.S. PATENT DOCUMENTS

| | | | |
|---|---|---|---|
| 4,945,438 A * | 7/1990 | Matsumoto et al. .......... 360/121 |
| 5,465,186 A | 11/1995 | Bajorek et al. |
| 5,894,651 A | 4/1999 | Dvorsky et al. |
| 5,898,541 A * | 4/1999 | Boutaghou et al. ........ 360/294.4 |
| 5,920,145 A | 7/1999 | Wu et al. |
| 5,920,978 A | 7/1999 | Koshikawa et al. |
| 6,052,879 A | 4/2000 | Wu et al. |
| 6,262,869 B1 | 7/2001 | Lin et al. |
| 6,291,930 B1 | 9/2001 | Sager |
| 6,297,936 B1 * | 10/2001 | Kant et al. ................. 360/294.4 |
| 6,320,730 B1 | 11/2001 | Stefansky et al. |
| 6,351,352 B1 | 2/2002 | Khan et al. |
| 6,351,353 B1 | 2/2002 | Sluzewski et al. |
| 6,351,354 B1 | 2/2002 | Bonin |
| 6,487,045 B1 | 11/2002 | Yanagisawa |
| 6,501,625 B1 | 12/2002 | Boismier et al. |
| 6,570,730 B1 | 5/2003 | Lewis et al. |
| 6,624,984 B2 | 9/2003 | Lewis et al. |
| 6,661,619 B2 | 12/2003 | Nishida et al. |
| 6,738,231 B2 * | 5/2004 | Arya et al. ................. 360/294.4 |

(Continued)

OTHER PUBLICATIONS

Kuwajima et al., "Thin-Film Piezoelectric DSA for HDD", IEEE Trans. Magn., vol. 38, No. 5, Sep. 2002, pp. 2186-2188.

(Continued)

*Primary Examiner* — Allen T Cao

(57) ABSTRACT

A head gimbal assembly (HGA) for a disk drive includes a mounting plate configured to be attachable to an actuator arm, a load beam extending from the mounting plate, a laminated flexure, first and second piezoelectric elements, and a read head. The laminated flexure includes a fixed portion that is attached to the load beam, and a head mounting tongue that is connected to the fixed portion by first and second compliant members. The read head is bonded to the head mounting tongue. The laminated flexure also includes first and second piezoelectric element receiving windows, each adjacent a respective one of the first and second compliant members. The first and second piezoelectric elements are each disposed within a respective one of the first and second piezoelectric element receiving windows.

28 Claims, 8 Drawing Sheets

U.S. PATENT DOCUMENTS

| | | | |
|---|---|---|---|
| 6,760,196 B1 | 7/2004 | Niu et al. | |
| 6,807,030 B1 | 10/2004 | Hawwa et al. | |
| 6,870,709 B2 | 3/2005 | Shimanouchi et al. | |
| 6,883,215 B2 | 4/2005 | Takeuchi et al. | |
| 6,928,722 B2 | 8/2005 | Yanagisawa | |
| 6,961,221 B1 | 11/2005 | Niu et al. | |
| 7,023,663 B2 | 4/2006 | Yao et al. | |
| 7,050,270 B1 * | 5/2006 | Oveyssi et al. | 360/266 |
| 7,057,857 B1 | 6/2006 | Niu et al. | |
| 7,057,858 B2 | 6/2006 | Pan et al. | |
| 7,072,149 B2 | 7/2006 | Kuwajima et al. | |
| 7,082,671 B2 | 8/2006 | Yanagisawa | |
| 7,151,650 B2 | 12/2006 | Lee | |
| 7,159,300 B2 | 1/2007 | Yao et al. | |
| 7,248,444 B1 | 7/2007 | Lauer | |
| 7,277,257 B2 | 10/2007 | Hipwell, Jr. et al. | |
| 7,280,319 B1 | 10/2007 | McNab | |
| 7,301,731 B2 | 11/2007 | Mita et al. | |
| 7,312,941 B2 | 12/2007 | Hirano et al. | |
| 7,345,851 B2 | 3/2008 | Hirano et al. | |
| 7,352,538 B2 | 4/2008 | Kurihara et al. | |
| 7,382,583 B2 | 6/2008 | Hirano et al. | |
| 7,391,590 B2 * | 6/2008 | Matono et al. | 360/125.32 |
| 7,417,831 B2 | 8/2008 | Yao et al. | |
| 7,420,785 B2 | 9/2008 | Yamazaki et al. | |
| 7,466,520 B2 | 12/2008 | White et al. | |
| 7,471,490 B2 | 12/2008 | Yao | |
| 7,474,512 B2 | 1/2009 | Yao et al. | |
| 7,525,769 B2 * | 4/2009 | Yao et al. | 360/294.4 |
| 7,535,680 B2 | 5/2009 | Yao et al. | |
| 7,538,984 B2 | 5/2009 | Yao | |
| 7,567,019 B2 | 7/2009 | Yamanaka et al. | |
| 7,609,487 B2 | 10/2009 | Yao et al. | |
| 7,612,963 B2 * | 11/2009 | Allen et al. | 360/123.06 |
| 7,663,843 B2 | 2/2010 | Yao | |
| 7,684,158 B1 * | 3/2010 | Lauer | 360/294.4 |
| 7,701,675 B2 | 4/2010 | Yao et al. | |
| 7,719,798 B2 | 5/2010 | Yao | |
| 7,733,607 B2 | 6/2010 | Yao et al. | |
| 7,916,427 B1 | 3/2011 | Lauer | |
| 8,015,692 B1 | 9/2011 | Zhang et al. | |
| 8,111,487 B2 | 2/2012 | Lauer | |
| 8,264,797 B2 | 9/2012 | Emley | |
| 8,295,012 B1 | 10/2012 | Tian et al. | |
| 2002/0191342 A1 | 12/2002 | Yanagisawa | |
| 2007/0223144 A1 * | 9/2007 | Yao et al. | 360/294 |
| 2007/0291419 A1 | 12/2007 | Lee et al. | |
| 2008/0024933 A1 | 1/2008 | Yao et al. | |
| 2008/0030905 A1 * | 2/2008 | Yamanaka et al. | 360/313 |
| 2008/0198511 A1 | 8/2008 | Hirano et al. | |
| 2009/0021857 A1 | 1/2009 | Shelor | |
| 2009/0034128 A1 * | 2/2009 | Sharma et al. | 360/294.4 |
| 2011/0116192 A1 * | 5/2011 | Fujita et al. | 360/235.1 |
| 2011/0149439 A1 | 6/2011 | Emley | |
| 2011/0176242 A1 | 7/2011 | Lauer | |
| 2011/0228425 A1 * | 9/2011 | Liu et al. | 360/244.2 |
| 2012/0242191 A1 | 9/2012 | Aimono | |

OTHER PUBLICATIONS

Oldham et al., "Thin-Film PZT Lateral Actuators With Extended Stroke", Journal of Microelectromechanical Systems, vol. 17, No. 4, Aug. 2008, pp. 890-899.

Seo et al., "Laterally driven thin film PZT actuator with high-aspect-ratio silicon beam for stroke amplification", Sensors and Actuators A, vol. 127 (2006), pp. 302-309.

Notice of Allowance dated Jun. 22, 2012 from U.S. Appl. No. 13/159,598, 10 pages.

* cited by examiner

DISK DRIVE HEAD SUSPENSION ASSEMBLY WITH EMBEDDED IN-PLANE ACTUATOR AT FLEXURE TONGUE

CROSS-REFERENCE TO RELATED APPLICATION

This application claims benefit under 35 U.S.C. §120 as a continuation-in-part of pending U.S. patent application Ser. No. 13/159,598, filed Jun. 14, 2011, entitled "Disk Drive Suspension Assembly with Rotary Fine Actuator at Flexure Tongue," which is hereby incorporated by reference in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc)

In a modern magnetic hard disk drive device, each read head is a sub-component of a head gimbal assembly (HGA). The read head typically includes a slider and a read/write transducer. The read/write transducer typically comprises a magneto-resistive read element (e.g. so-called giant magneto-resistive read element, or a tunneling magneto-resistive read element), and an inductive write structure comprising a flat coil deposited by photolithography, and a yoke structure having pole tips that face a disk media.

The HGA typically also includes a suspension assembly that includes a mounting plate, a load beam, and a laminated flexure to carry the electrical signals to and from the read head. The read head is typically bonded to a tongue feature of the laminated flexure. The HGA, in turn, is a sub-component of a head stack assembly (HSA) that typically includes a plurality of HGAs, a rotary actuator, and a flex cable. The mounting plate of each suspension assembly is attached to an arm of the rotary actuator (e.g. by swaging), and each of the laminated flexures includes a flexure tail that is electrically connected to the HSA's flex cable (e.g. by solder reflow bonding or ultrasonic bonding).

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that are electrically connected to a plurality of electrically conductive bonding pads on the head (e.g. by gold ball bonding), and extend from adjacent the head to terminate at electrical connection points at the flexure tail.

The position of the HSA relative to the spinning disks in a disk drive, and therefore the position of the read heads relative to data tracks on the disks, is actively controlled by the rotary actuator which is typically driven by a voice coil motor (VCM). Specifically, electrical current passed through a coil of the VCM applies a torque to the rotary actuator, so that the read head can seek and follow desired data tracks on the spinning disk.

However, the industry trend towards increasing areal data density has necessitated substantial reduction in the spacing between data tracks on the disk. Also, disk drive performance requirements, especially requirements pertaining to the time required to access desired data, have not allowed the rotational speed of the disk to be reduced. In fact, for many disk drive applications, the rotational speed has been significantly increased. A consequence of these trends is that increased bandwidth is required for servo control of the read head position relative to data tracks on the spinning disk.

One solution that has been proposed in the art to increase disk drive servo bandwidth is dual-stage actuation. Under the dual-stage actuation concept, the rotary actuator that is driven by the VCM is employed as a coarse actuator (for large adjustments in the HSA position relative to the disk), while a so-called "microactuator" having higher bandwidth but lesser stroke is used as a fine actuator (for smaller adjustments in the read head position). Various microactuator designs have been proposed in the art for the purpose of dual-stage actuation in disk drive applications. Some of these designs utilize one or more piezoelectric microactuators that are affixed to a component of the suspension assembly. For example, the piezoelectric microactuator may be affixed to the mounting plate or an extension thereof, and/or the load beam or an extension thereof, or to the flexure tongue (a.k.a. the "gimbal tongue") to which the read head is bonded).

However, generally, the further the microactuator is disposed from the read head on the suspension assembly, the less bandwidth it can provide. This is due to the dynamics introduced by the intermediate structure of the suspension assembly. On the other hand, the closer the microactuator is disposed to the read head on the suspension assembly, the lesser stroke it can typically provide. Hence there is a need in the information storage device arts for a microactuator design that can provide both adequate stroke and adequate bandwidth for fine actuation.

Moreover, certain prior art concepts in which the microactuator is disposed on the flexure tongue, may cause excessive vertical deflection of the flexure tongue, where in-plane motion is desired. This may undesirably affect pitch and roll moments applied to the read head, which can adversely affect the desired spacing between the read head and the rotating disk medium, and therefore adversely affect read head operation. Hence, there is a need in the information storage device arts for a fine actuator ("microactuator") design that does not cause or experience excessive vertical gimbal deflection.

DETAILED DESCRIPTION OF EXEMPLARY EMBODIMENTS

Figure 1:
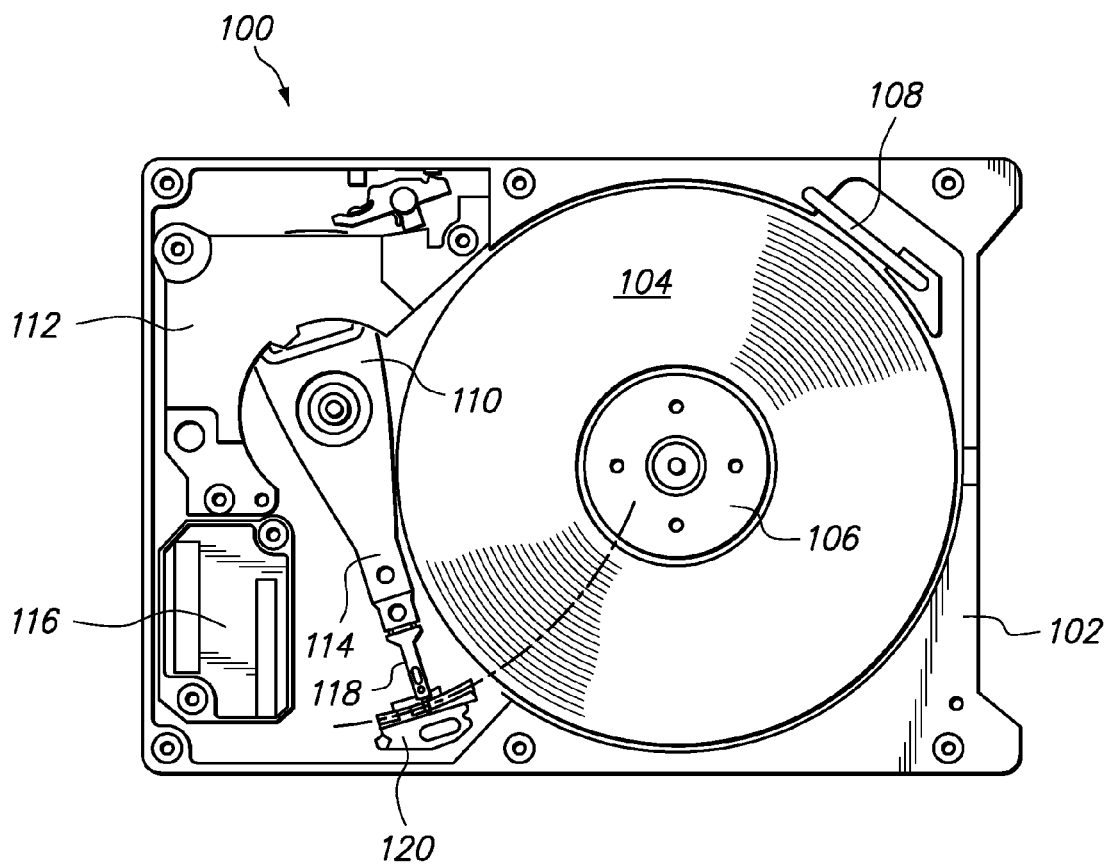
FIG. 1 is top view of a disk drive capable of including an embodiment of the present invention.

FIG. 1 is top view of a disk drive 100 that is capable of including an embodiment of the present invention. The disk drive 100 includes a disk drive base 102. The disk drive 100 further includes a spindle 106, rotably mounted on the disk drive base 102, for rotating at least one disk 104 that is mounted on the spindle 106. The rotation of the disk(s) 104 establishes air flow through optional recirculation filter 108. In certain embodiments, disk drive 100 may have only a single disk 104, or alternatively, two or more disks.

The disk drive 100 further includes a rotary coarse actuator 110 that is rotably mounted on disk drive base 102. The rotary coarse actuator 110 includes an actuator arm 114 that supports a head gimbal assembly (HGA) 118. Voice coil motor 112 rotates the actuator 110 through a limited angular range so that the HGA 118 may be desirably positioned relative to one or more tracks of information on the disk 104. Preferably the disk drive 100 will include one HGA 118 per disk surface, but depopulated disk drives are also contemplated in which fewer HGAs are used. Under non-operating conditions the HGAs may be parked on ramp 120, for example to avoid contact with the disk 104 when it is not spinning. Electrical signals to/from the HGA 118 are carried to other drive electronics, in part via a flex cable (not shown) and a flex cable bracket 116.

Figure 2A:
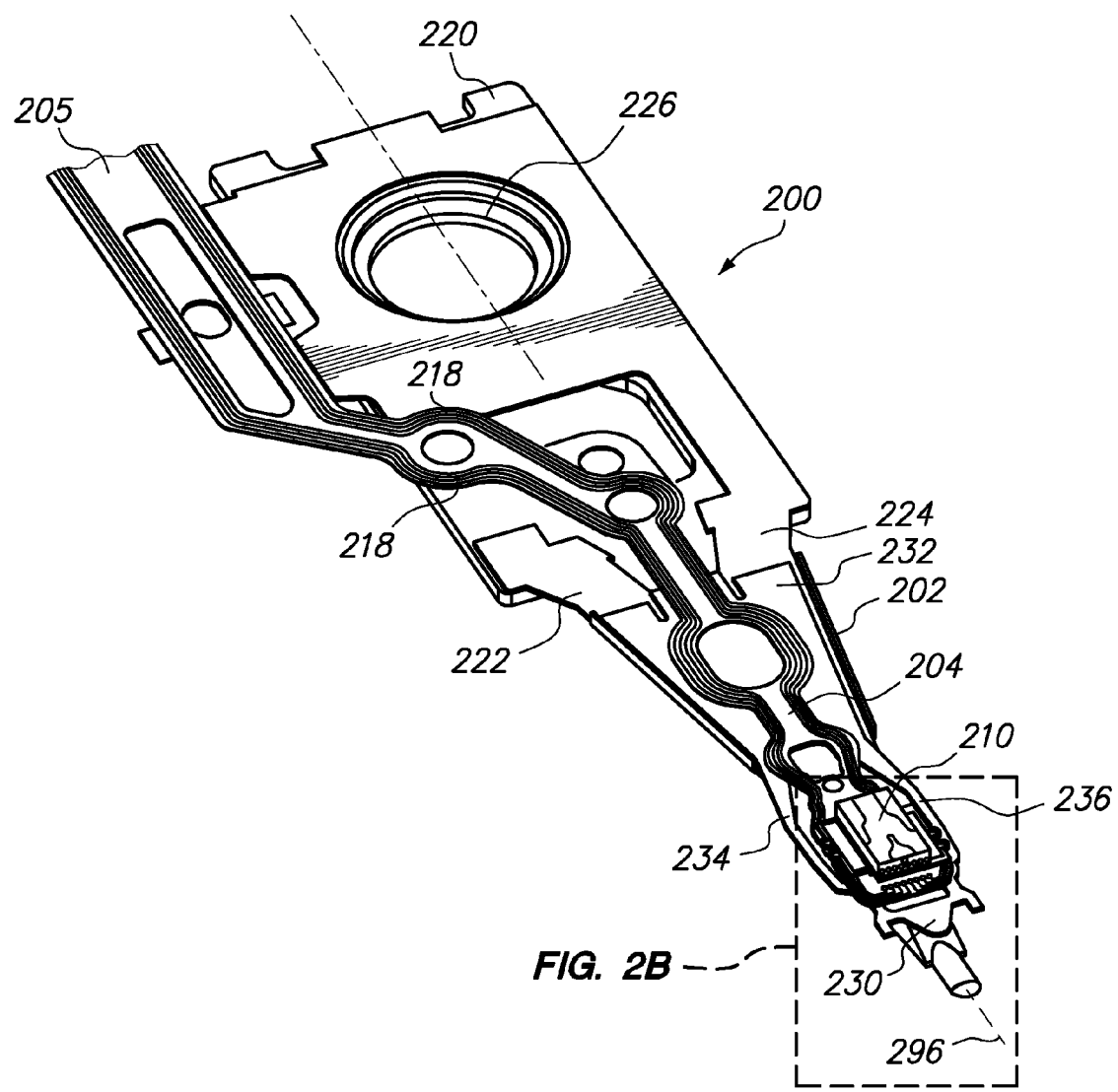
FIG. 2A is a bottom perspective view of a head gimbal assembly (HGA) according to an embodiment of the present invention.
Figure 2B:
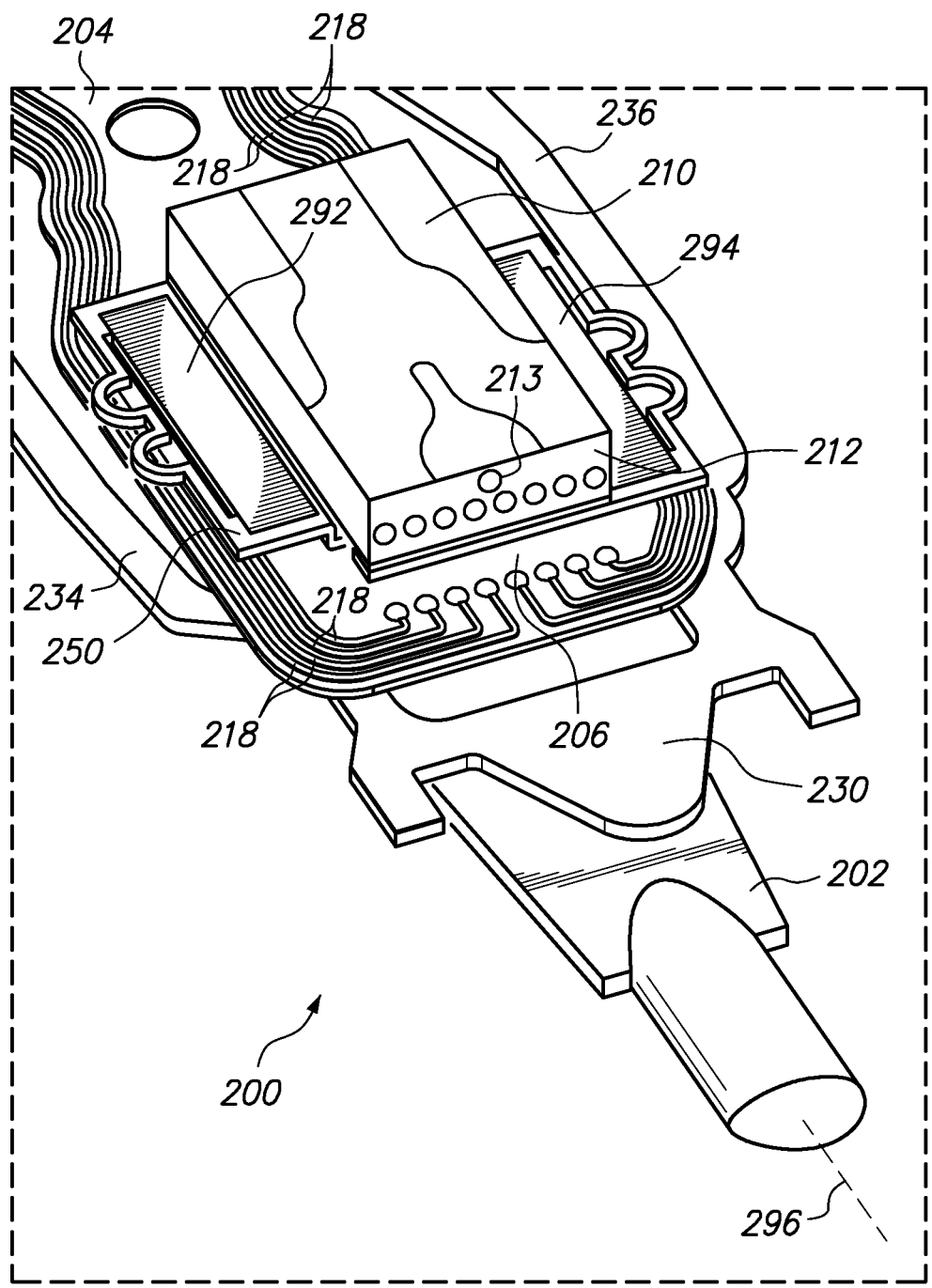
FIG. 2B is an expanded view of a portion of the HGA of FIG. 2A.

FIG. 2A is a bottom perspective view of a HGA 200 according to an embodiment of the present invention. FIG. 2B is an expanded view of a portion of the HGA 200. Now referring additionally to FIGS. 2A and 2B, the HGA 200 includes a load beam 202 that defines a load beam longitudinal axis 296, and a read head 210 for reading and writing data from and to a magnetic disk (e.g. disk 104). The read head 210 includes a slider substrate having an air bearing surface (the label 210 points to this surface) and an opposing top surface (not visible in the view of FIG. 2). The slider substrate preferably comprises AlTiC, although another ceramic or silicon might also be used. The slider substrate of the read head 210 also includes a trailing face 212 that includes a read/write transducer 213. In certain embodiments, the read/write transducer 213 is preferably an inductive magnetic write transducer merged with a magneto-resistive read transducer (e.g. a tunneling magneto-resistive read transducer). A purpose of the load beam 202 is to provide limited vertical compliance for the read head 210 to follow vertical undulations of the surface of a disk (e.g. disk 104) as it rotates, and to preload the air bearing surface of the read head 210 against the disk surface by a preload force that is commonly referred to as the "gram load."

In the embodiment of FIGS. 2A and 2B, the HGA 200 also includes a laminated flexure 204. A distal portion 230 of the laminated flexure 204 includes a tongue 206 that is connected to a non-distal portion 232 of the laminated flexure 204 by two outrigger beams 234, 236. Only a portion of the tongue 206 is visible in the view of FIGS. 2A and 2B because the read head 210 (and other components of the HGA 200 that will be subsequently described) partially obscures it. A first purpose of the laminated flexure 204 is to provide compliance for the head 210 to follow pitch and roll angular undulations of the surface of the disk (e.g. disk 104) as it rotates, while restricting relative motion between the read head 210 and the load beam 202 in the lateral direction and about a yaw axis.

A second purpose of the laminated flexure 204 may be to provide a plurality of electrical paths to facilitate signal transmission to/from the read head 210. For that second purpose, the laminated flexure 204 includes a plurality of electrically conductive traces 218 that are defined in an electrically conductive (e.g. copper) sub-layer of the laminated flexure 204. Electrically conductive traces 218 are insulated from a support layer (e.g. stainless steel) by a dielectric layer (e.g. polyimide). The electrically conductive traces 218 may extend away from the read head 210 along a flexure tail 205 of the laminated flexure 204, to reach a portion of the flex cable (not shown) that includes a preamplifier chip near the body of the actuator (e.g. actuator 110).

In the embodiment of FIGS. 2A and 2B, the load beam 202 includes hinge plates 222 and 224, and is attached to a mounting plate 220 via the hinge plates 222 and 224. These components may be made of stainless steel, and their attachments to each other may be made by a plurality of spot welds, for example. Alternatively, the load beam 202 may have integral hinge plate regions rather than being assembled with separate hinge plate components, so that the load beam 202 and its hinge plates would be a single component having material continuity.

The load beam 202 with its hinge plates 222, 224 (if any), and the mounting plate 220, may together be referred to as a "suspension assembly." Accordingly, the mounting plate 220 may also be referred to as a suspension assembly mounting plate 220. In certain preferred embodiments, the suspension assembly mounting plate 220 includes an annular swage boss 226 to facilitate attachment of the suspension assembly to an actuator arm (e.g. actuator arm 114) by the well known conventional attachment process known as swaging. In that case, the suspension assembly mounting plate 220 may also be referred to as a "swage mounting plate." Note that, after the laminated flexure 204 is attached to the load beam 202, the laminated flexure 204 may be considered to also pertain to the "suspension assembly." However, before the laminated flexure 204 is attached to the load beam 202, the term "suspension assembly" may refer to only the load beam 202 with its hinge plates 222, 224 (if any), and the mounting plate 220.

In the embodiment of FIGS. 2A and 2B, the HGA 200 is depicted to also include an actuator frame 250 that is attached to or part of the tongue 206 of the distal portion 230 of the laminated flexure 204. In the embodiment of FIGS. 2A and 2B, first and second piezoelectric elements 292, 294 are embedded into corresponding piezoelectric element receiving windows of the actuator frame 250. Each of the first and second piezoelectric elements 292, 294 may optionally comprise one or more of the many known piezoelectric materials, for example lead zirconate titanate, lead scandium tantalite, lanthanum gallium silicate, lithium tantalite, barium titanate, gallium phosphate and/or potassium sodium tartrate. Each of the first and second piezoelectric elements 292, 294 may optionally be a laminated piezoelectric element that comprises a plurality of layers of piezoelectric material disposed between pairs of a plurality of electrically conductive electrode layers (e.g. gold layers).

The head 210 is attached to an actuated portion of the actuator frame 250, as described with reference to subsequent figures herein. The read head 210 may be electrically connected to more than one of the plurality of conductive traces 218, and the first and second piezoelectric elements 292, 294 may be each electrically connected to at least one of the plurality of conductive traces 218.

Figure 3:
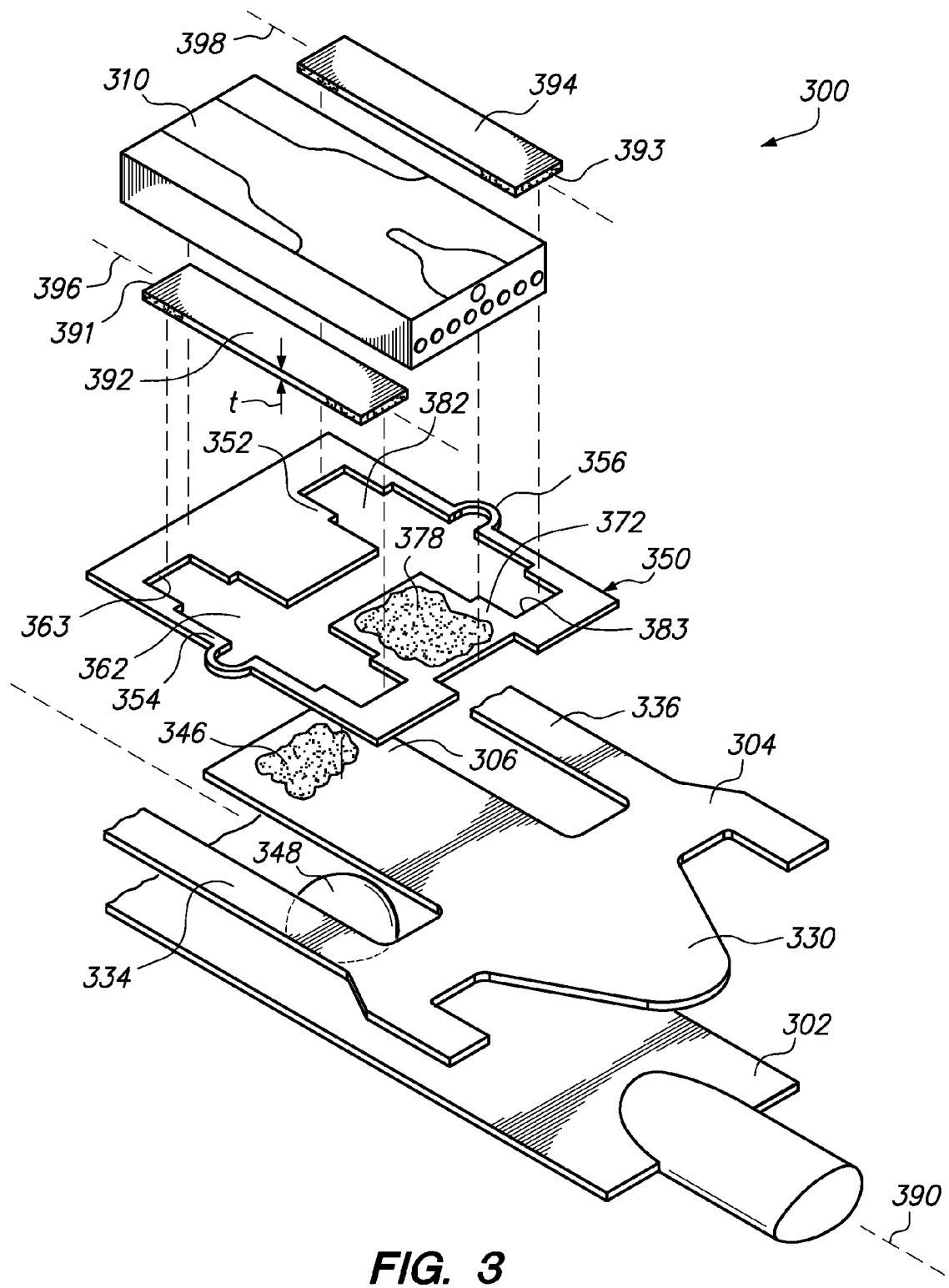
FIG. 3 is a bottom exploded perspective view of several components of a HGA according to an embodiment of the present invention.
Figure 4:
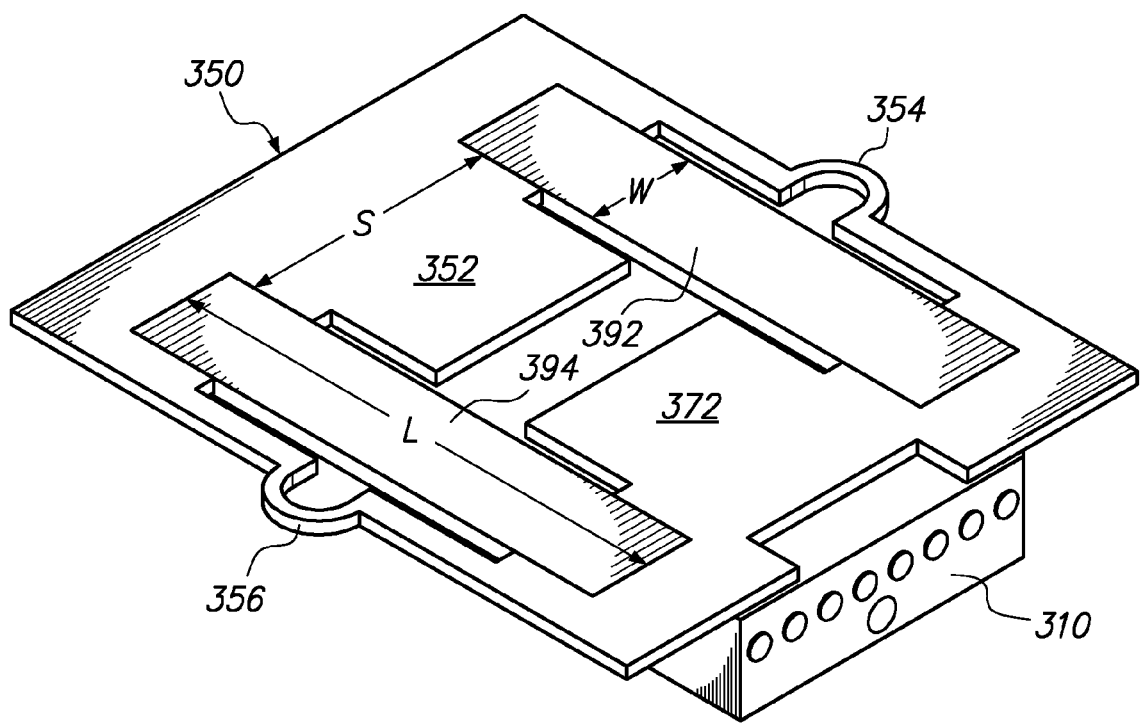
FIG. 4 is a top perspective assembled view of the actuator frame, piezoelectric elements, and read head of FIG. 3.

FIG. 3 is a bottom exploded perspective view of several components of a HGA 300 according to an embodiment of the present invention. FIG. 4 is a top perspective assembled view of those HGA components. Now referring to FIGS. 3 and 4, the HGA 300 includes a load beam 302, and a laminated flexure 304 (only the structural layer of the flexure is shown in FIG. 3; the conventional dielectric layer, and the conventional traces of the conductive layer of the laminated flexure 304 are not shown, so that certain novel features of the HGA 300 can be seen more clearly).

In the embodiment of FIGS. 3 and 4, a distal portion 330 of the laminated flexure 304 includes a tongue 306 that is connected to a non-distal portion of the laminated flexure 304 by outrigger beams 334, 336.

In the embodiment of FIGS. 3 and 4, the laminated flexure 304 includes an actuator frame 350. The actuator frame 350 includes a fixed portion 352 that is attached to (e.g. adhered to) or is part of the tongue 306. The actuator frame 350 also includes an actuated portion 372 that has a head mounting surface and is connected to the fixed portion 352 by first and second compliant members 354, 356. In certain embodiments, each of the first and second compliant members 354, 356 is considered "compliant" if its longitudinal stiffness is substantially less than that of an adjacent piezoelectric element. Each of the first and second compliant members 354, 356 may be curved to enhance its compliance for compression or elongation along its length (for example including one, two, or more semicircular lobes along its length).

The actuator frame 350 also includes first and second piezoelectric element receiving windows 362, 382, each preferably adjacent and bounded by a respective one of the first and second compliant members 354, 356. In the embodiment of FIGS. 3 and 4, the HGA 300 includes first and second piezoelectric elements 392, 394, each being disposed within a respective one of the first and second piezoelectric element receiving windows 362, 382. A read head 310 is adhered to the mounting surface of the actuated portion 372 of the actuator frame 350 by an adhesive material 378 (e.g. conventional epoxy, cyanoacrylate, etc). The first piezoelectric element 392 defines a first element longitudinal axis 396 that is parallel to the load beam longitudinal axis 390. Since perfect parallelism is not practical to achieve when fabricating such small structures, the term parallel, as used herein, shall mean within ±10 degrees of perfect parallelism.

Referring again to the embodiment of FIGS. 3 and 4, at least one edge 391 of the first piezoelectric element 392 is bonded by an adhesive to an edge 363 of the actuator frame 350 that faces into the first piezoelectric element receiving window 362. Likewise, the second piezoelectric element 394 defines a second element longitudinal axis 398 that is parallel to the load beam longitudinal axis 390. At least one edge 393 of the second piezoelectric element 394 is bonded by an adhesive to an edge 383 of the actuator frame 350 that faces into the second piezoelectric element receiving window 382. In certain embodiments, the adhesive used to bond the first and second piezoelectric elements 392, 394 to the actuator frame 350 may be an electrically non-conductive cyanoacrylate, epoxy, polyimide, and/or acrylic. The non-conductivity of such adhesive may be advantageous in certain embodiments where electrode layers of a piezoelectric element might otherwise be shorted, though a conductive adhesive might provide advantageous grounding in certain embodiments where a coating on the piezoelectric element would prevent shorting.

In certain embodiments, a conductive adhesive, solder, ribbon leads, and/or gold wire stitching may be used to make conventional electrical connections to the piezoelectric elements 392, 394. However, if solder is used, then it may be desirable for the solder to have a low temperature melting point, since it may be undesirable for it to get so hot that the piezoelectric material becomes depolarized.

In certain embodiments, a side of each piezoelectric element 392, 394 may be grounded via electrical conduction through the actuator frame and the stainless steel parts of the suspension assembly (used as the ground conductor rather than or in addition to a ground trace of the laminated flexure). In certain embodiments, the actuated portion 372 and the fixed portion 352 of the actuator frame 350 are preferably fabricated from a metal material (e.g. stainless steel).

In the embodiment of FIGS. 3 and 4, the fixed portion 352, the actuated portion 372, and the first and second curved compliant members 354, 356, are a single component having material continuity rather than being an assembly of sub-components. For example, the fixed portion 352, the actuated portion 372, and the first and second curved compliant members 354, 356, may be distinct regions of a single stainless steel sheet, each distinct region being at least partially bounded and defined by etched openings through the single stainless steel sheet. Note that one of ordinary skill can determine whether an opening is an etched opening from the structure alone (e.g. inspection of the edges) without first being told what process was used to create such opening. Hence, the term "etched opening" is properly considered as a structural limitation herein, rather than a merely as a process limitation.

In the embodiment of FIGS. 3 and 4, such single component may be bonded to the tongue 306 of the distal portion 330 of the laminated flexure 304 by a bonding material 346 (e.g. an adhesive such as an epoxy adhesive). The adhesives 346 and 378 may be a conventional adhesive (e.g. UV cured epoxy, thermal set epoxy, epoxy doped with an electrically conductive filler, etc) or a conventional solder material.

The load beam 302 optionally includes a dimple 348 (e.g. a hemispherical dimple) that protrudes upwards towards the read head 310, and contacts the tongue 306 at a dimple contact location. The actuator frame 350 and the first and second piezoelectric elements 392, 394 preferably rotate the read head 310 about a fine actuator axis of rotation that passes through the dimple contact location.

However, in an alternative embodiment, the fixed portion 352 is fabricated from the head mounting tongue 306 so that it is a region of the head mounting tongue 306. In that case, the head mounting tongue 306, the fixed portion 352, the actuated portion 372, and the first and second curved compliant members 354, 356 could be a single component having material continuity rather than being an assembly of sub-components. For example, the head mounting tongue 306, the fixed portion 352, the actuated portion 372, and the first and second curved compliant members 354, 356 may be distinct regions of a single stainless steel sheet, each distinct region being at least partially bounded and defined by etched openings through the single stainless steel sheet. In this alternative embodiment, the dimple 348 may contact the fixed portion 352, or pass through an opening in the fixed portion 352 to contact the read head 310 directly at a dimple contact location. Alignment of the axis of rotation of the actuated portion 372 with the dimple contact location may advantageously reduce or eliminate undesired stick-slip relative motion between the dimple 348 and rotating parts during operation.

In the embodiment of FIGS. 3 and 4, the read head 310 is preferably bonded to the actuated portion 372, at a head mounting surface thereof that is parallel to the tongue 306. Again in this context, since perfect parallelism is not practical to achieve when fabricating such small structures, the term "parallel" shall mean within ±5 degrees of perfect parallelism. As shown in FIG. 4, the read head 310 is preferably disposed between the first and second piezoelectric elements 392, 394, and the first and second piezoelectric elements 392, 394 are disposed closer to the read head 310 than are the first and second curved compliant members 354, 356. For example, the first and second piezoelectric elements 392, 394 may be disposed between the first and second curved compliant members 354, 356, as viewed from above or below the HGA 300.

Also, in the embodiment of FIGS. 3 and 4, the first and second piezoelectric elements 392, 394 each define a piezoelectric element thickness t, and a mid-plane of the piezoelectric element thickness is preferably aligned (in the thickness direction) with a neutral plane of the actuator frame 350 (determined adjacent the first and second piezoelectric elements 392, 394). The term "neutral plane" is a well-known term of art in the field of mechanical engineering, and is given its ordinary meaning herein, and so one of ordinary skill in the mechanical engineering arts would be able to readily determine the neutral plane in bending (for the region of the actuator frame 350 adjacent the first and second piezoelectric elements 392, 394). Such preferred alignment may, in certain embodiments, decrease undesired out-of-plane deflection of the first and second piezoelectric elements 392, 394, and/or of regions of the actuator frame 350, during operation.

In certain embodiments, the piezoelectric element thickness t may be greater than the thickness of the laminated flexure 304. For example, in certain embodiments the piezoelectric element thickness t may be in the range 30 microns to 150 microns, while the thickness of the laminated flexure 304 may be in the range 18 microns to 80 microns.

FIG. 4 is a top perspective assembled view of the actuator frame 350, first and second piezoelectric elements 392, 394, and read head 310 of FIG. 3. In the embodiment of FIG. 4, the first and second piezoelectric elements 392, 394 are disposed closer to the read head 310 than are the first and second compliant members 354, 356. Optionally, each of the first and second piezoelectric elements 392, 394 may have a length L in the range 0.5 mm to 1.5 mm. Optionally, each of the first and second piezoelectric elements 392, 394 may have a width W in the range 150 microns to 350 microns. Optionally, the first and second piezoelectric elements 392, 394 may be separated from each other by a separation distance S in the range 0.5 mm to 1.5 mm. These dimensional ranges may, in certain embodiments, help the movement of the actuated portion 372 and/or the head 310 to be closer to pure rotational motion about a load point (e.g. a point of contact with the dimple 348 of FIG. 3).

Figure 5:
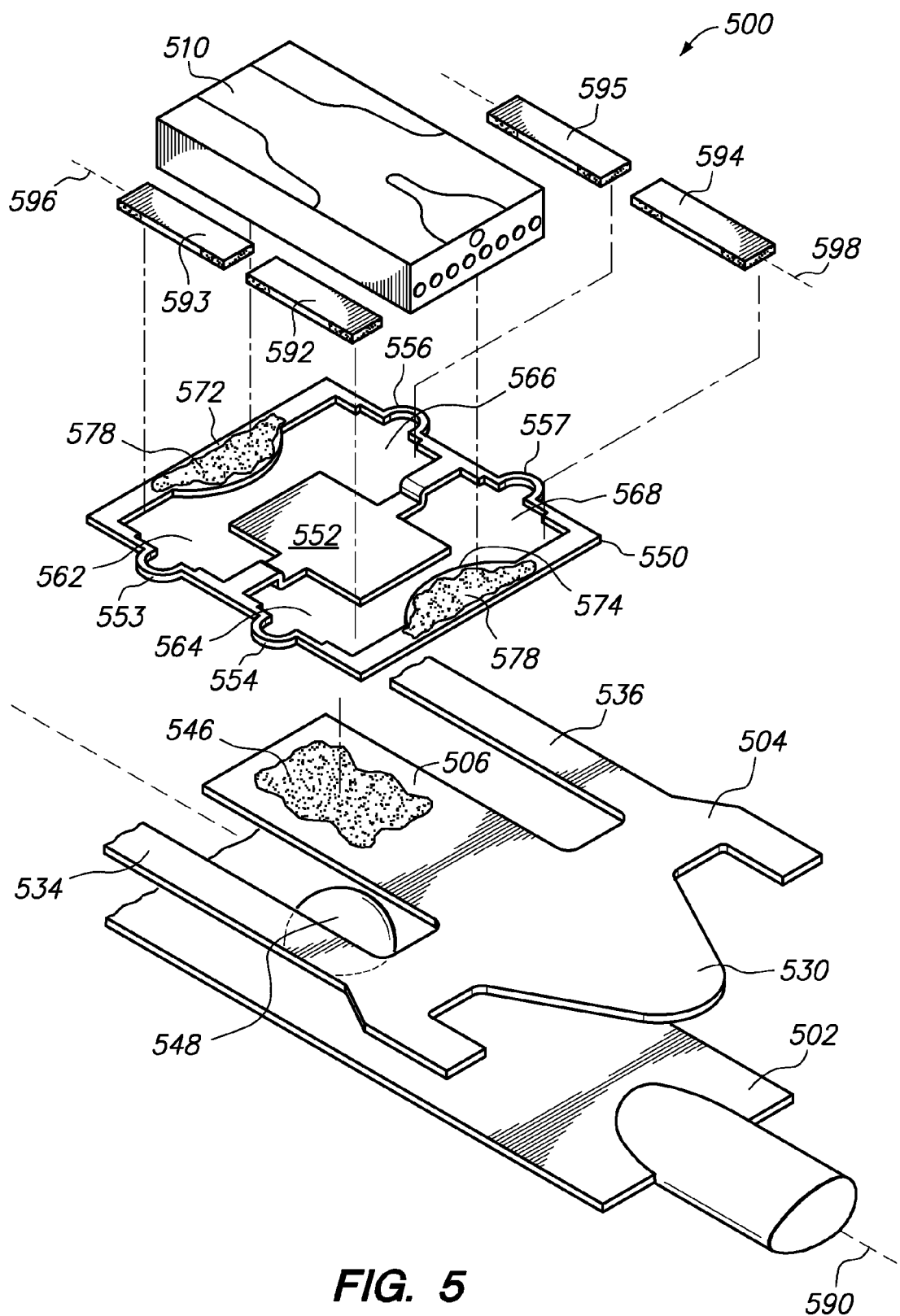
FIG. 5 is a bottom exploded perspective view of several components of a HGA according to an embodiment of the present invention.
Figure 6:
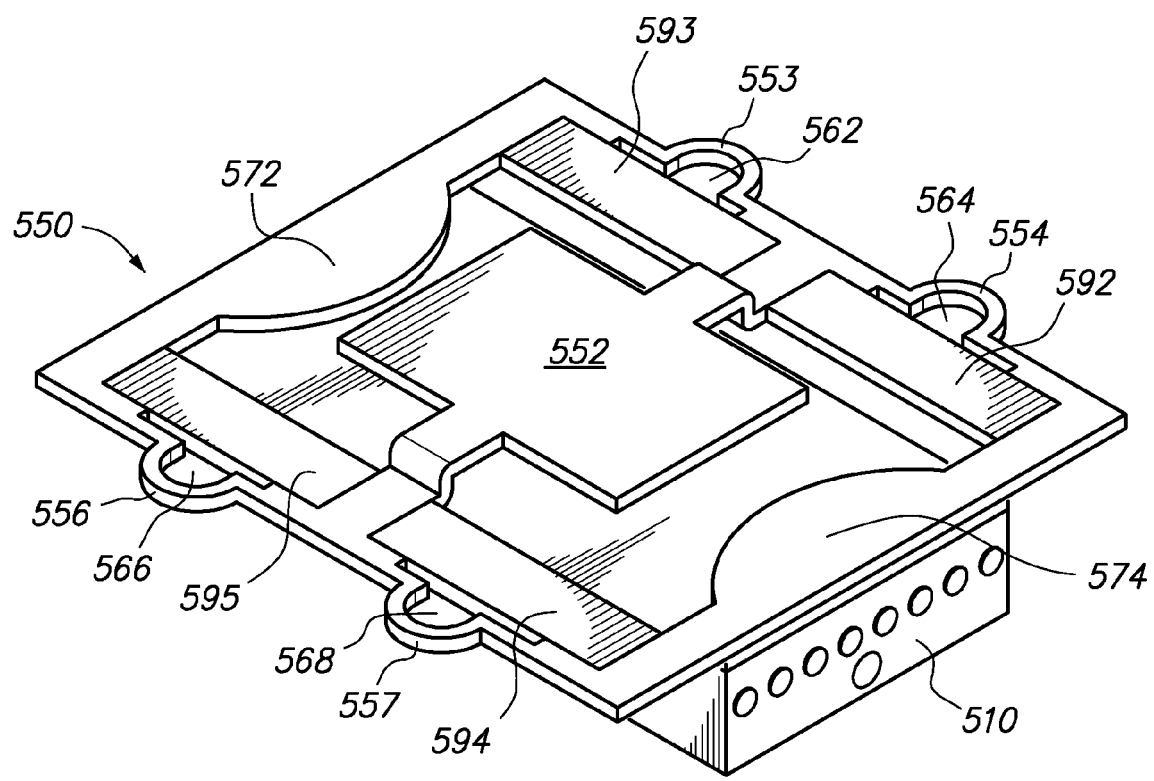
FIG. 6 is a top perspective assembled view of the actuator frame, piezoelectric elements, and read head of FIG. 5.

FIG. 5 is a bottom exploded perspective view of several components of a HGA 500 according to an embodiment of the present invention. FIG. 6 is a top perspective assembled view of those HGA components. Now referring to FIGS. 5 and 6, the HGA 500 includes a load beam 502, and a laminated flexure 504 (only the structural layer of the flexure is shown in FIG. 5; the conventional dielectric layer, and the conventional traces of the conductive layer of the laminated flexure 504 are not shown, so that certain novel features of the HGA 500 can be seen more clearly).

In the embodiment of FIGS. 5 and 6, a distal portion 530 of the laminated flexure 504 includes a tongue 506 that is connected to a non-distal portion of the laminated flexure 504 by outrigger beams 534, 536.

In the embodiment of FIGS. 5 and 6, the laminated flexure 504 includes an actuator frame 550. The actuator frame 550 includes a fixed portion 552 that is attached to (e.g. adhered to) or is part of the tongue 506. The actuator frame 550 also includes actuated portions 572, 574, each having a head mounting surface. The actuated portion 572 is connected to the fixed portion 552 by first and second compliant members 553, 556. The actuated portion 574 is connected to the fixed portion 552 by third and fourth compliant members 554, 557. In certain embodiments, each of the first, second, third, and fourth compliant members 553, 556, 554, 557 is considered "compliant" if its longitudinal stiffness is substantially less than that of an adjacent piezoelectric element. Each of the first, second, third, and fourth compliant members 553, 556, 554, 557 may be curved to enhance its compliance for compression or elongation along its length (for example including one, two, or more semicircular lobes along its length).

The actuator frame 550 also includes first, second, third, and fourth piezoelectric element receiving windows 562, 566, 564, 568 each preferably adjacent and bounded by a respective one of the first, second, third, and fourth compliant members 553, 556, 554, 557. In the embodiment of FIGS. 5 and 6, the HGA 500 includes first, second, third, and fourth piezoelectric elements 593, 595, 592, 594, each being disposed within a respective one of the first, second, third, and fourth piezoelectric element receiving windows 562, 566, 564, 568. A read head 510 is adhered to the mounting surface of each of the actuated portions 572, 574 of the actuator frame 550 by an adhesive material 578 (e.g. conventional epoxy, cyanoacrylate, etc). The first piezoelectric element 593 defines a first element longitudinal axis 596 that is parallel to the load beam longitudinal axis 590.

Referring again to the embodiment of FIGS. 5 and 6, at least one edge of the first piezoelectric element 593 is bonded by an adhesive to an edge of the actuator frame 550 that faces into the first piezoelectric element receiving window 562. Likewise, the second piezoelectric element 595 defines a second element longitudinal axis 598 that is parallel to the load beam longitudinal axis 590. At least one edge of the second piezoelectric element 595 is bonded by an adhesive to an edge of the actuator frame 550 that faces into the second piezoelectric element receiving window 566. In certain embodiments, the adhesive used to bond the first and second piezoelectric elements 593, 595 to the actuator frame 550 may be an electrically non-conductive cyanoacrylate, epoxy, polyimide, and/or acrylic.

In certain embodiments, a conductive adhesive, solder, ribbon leads, and/or gold wire stitching may be used to make conventional electrical connections to the piezoelectric elements 593, 595, 592, 594. However, if solder is used, then it may be desirable for the solder to have a low temp-melting-point since it may be undesirable for it to get so hot that the piezoelectric material becomes depolarized.

In certain embodiments, a side of each piezoelectric element 593, 595, 592, 594 may be grounded via electrical conduction through the actuator frame 550 and the stainless steel parts of the suspension assembly (used as the ground conductor rather than or in addition to a ground trace of the laminated flexure). In certain embodiments, the actuated portions 572, 574 and the fixed portion 552 of the actuator frame 550 are preferably fabricated from a metal material (e.g. stainless steel).

In the embodiment of FIGS. 5 and 6, the fixed portion 552, the actuated portions 572, 574 and the first, second, third, and fourth compliant members 553, 556, 554, 557 are a single component having material continuity rather than being an assembly of sub-components. For example, the fixed portion 552, the actuated portions 572, 574 and the first, second, third, and fourth compliant members 553, 556, 554, 557, may be distinct regions of a single stainless steel sheet, each distinct region being at least partially bounded and defined by etched openings through the single stainless steel sheet.

In the embodiment of FIGS. 5 and 6, such single component may be bonded to the tongue 506 of the distal portion 530 of the laminated flexure 504 by a bonding material 546 (e.g. an adhesive such as an epoxy adhesive). The adhesives 546 and 578 may be a conventional adhesive (e.g. UV cured epoxy, thermal set epoxy, epoxy doped with an electrically conductive filler, etc) or a conventional solder material.

The load beam 502 optionally includes a dimple 548 (e.g. a hemispherical dimple) that protrudes upwards towards the read head 510, and contacts the tongue 506 at a dimple contact location. The actuator frame 550 and the piezoelectric elements 593, 595, 592, 594 preferably rotate the read head 510 about a fine actuator axis of rotation that passes through the dimple contact location.

However, in an alternative embodiment, the fixed portion 552 is fabricated from the head mounting tongue 506 so that it is a region of the head mounting tongue 506. In that case, the head mounting tongue 506, the fixed portion 552, the actuated portions 572, 574 and the first, second, third, and fourth compliant members 553, 556, 554, 557 could be a single component having material continuity rather than being an assembly of sub-components. For example, the head mounting tongue 506, the fixed portion 552, the actuated portions 572, 574 and the first, second, third, and fourth compliant members 553, 556, 554, 557 may be distinct regions of a single stainless steel sheet, each distinct region being at least partially bounded and defined by etched openings through the single stainless steel sheet. In this alternative embodiment, the dimple 548 may contact the fixed portion 552, or pass through an opening in the fixed portion 552 to contact the read head 510 directly at a dimple contact location. Alignment of the axis of rotation of the actuated portions 572, 574 with the dimple contact location may advantageously reduce or eliminate undesired stick-slip relative motion between the dimple 548 and rotating parts during operation.

In the embodiment of FIGS. 5 and 6, the read head 510 is preferably bonded to the actuated portions 572, 574 at head mounting surfaces thereof that are parallel to the tongue 506. Again in this context, since perfect parallelism is not practical to achieve when fabricating such small structures, the term "parallel" shall mean within ±5 degrees of perfect parallelism. As shown in FIG. 6, the read head 510 is preferably disposed between the first and second piezoelectric elements 593, 595, and the first and second piezoelectric elements 593, 595 are disposed closer to the read head 510 than are the first and second curved compliant members 553, 556. For example, the first and second piezoelectric elements 593, 595 may be disposed between the first and second curved compliant members 553, 556, as viewed from above or below the HGA 500.

Also, in the embodiment of FIGS. 5 and 6, a mid-plane of the thickness of each of the piezoelectric elements 593, 595, 592, 594 is preferably aligned with a neutral plane of the actuated portions 572, 574 of the actuator frame 550. Such preferred alignment (in the thickness direction) may, in certain embodiments, decrease undesired out-of-plane deflection of the piezoelectric elements 593, 595, 592, 594, and/or of regions of the actuator frame 550, during operation. In certain embodiments, the piezoelectric element thickness may be greater than the thickness of the laminated flexure 504.

Figure 7:
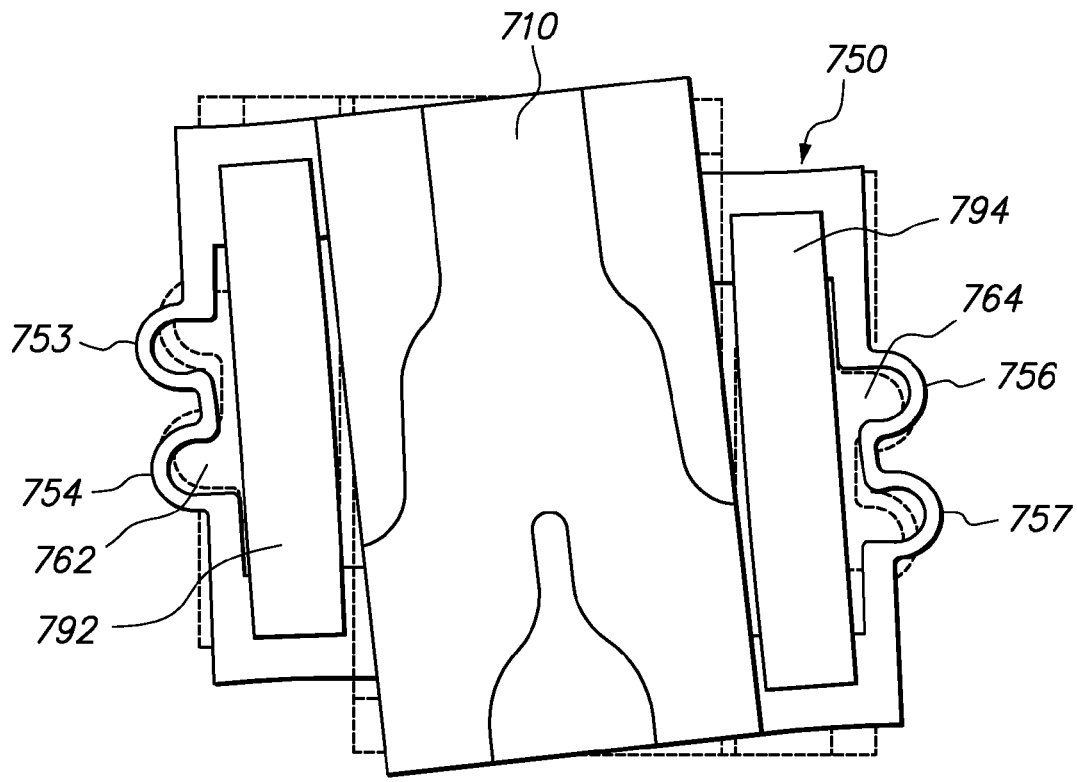
FIG. 7 is a bottom view of a portion of a HGA according to an embodiment of the present invention, during operation of the piezoelectric elements, with angular deflection exaggerated for clarity.

FIG. 7 is a bottom view of a head 710, an actuator frame 750, and piezoelectric elements 792, 794 according to an embodiment of the present invention, with angular deflection exaggerated for clarity. Each of the piezoelectric elements 792, 794 is disposed within a respective one of piezoelectric element receiving windows 762, 764. In the embodiment of FIG. 7, the first and second piezoelectric elements 792, 794 are each caused to contract by an applied electric field (e.g. by applying an electrical potential across conventional electrodes). Such contraction compresses the curved compliant members 753, 754, 756, 757, so that the head rotates counter-clockwise in the view of FIG. 7. Reversing the applied electric field would expand the first and second piezoelectric elements 792, 794, stretching the curved compliant members 753, 754, 756, 757, so that the head 710 would rotate clockwise in the view of FIG. 7.

Figure 8:
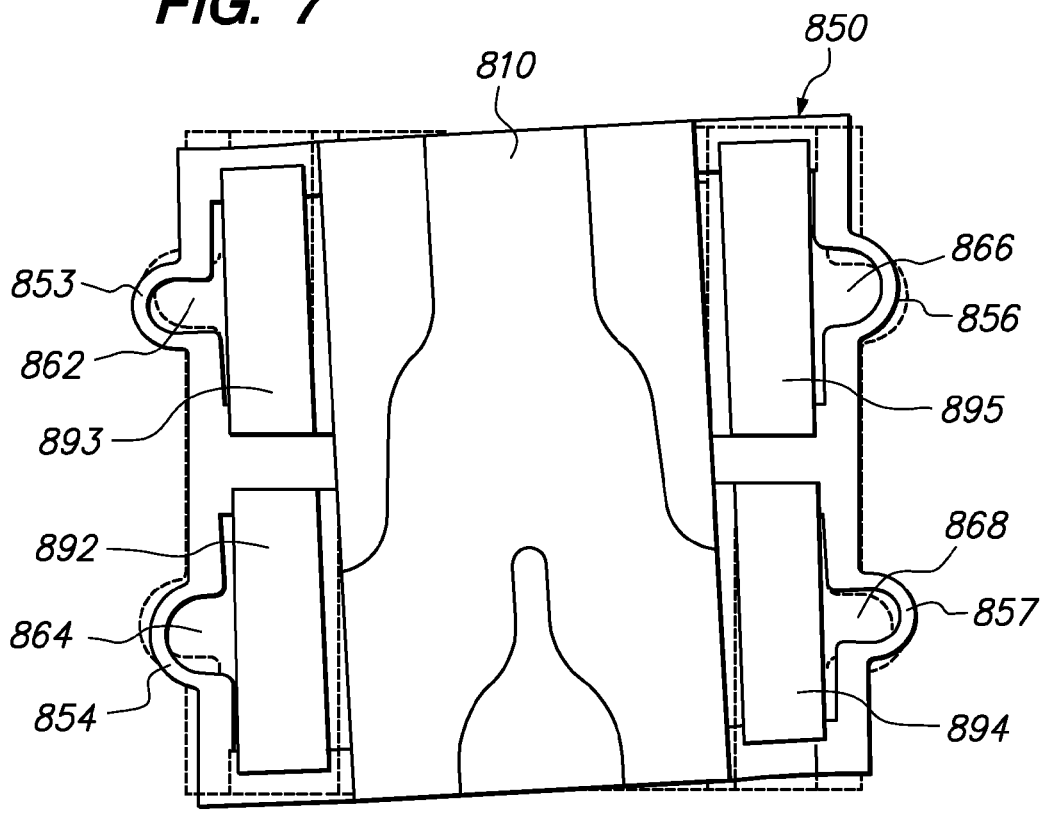
FIG. 8 is a bottom view of a portion of a HGA according to another embodiment of the present invention, during operation of the piezoelectric elements, with angular deflection exaggerated for clarity.

FIG. 8 is a bottom view of a head 810, an actuator frame 850, and piezoelectric elements 892, 893, 894, 895 according to an embodiment of the present invention, with angular deflection exaggerated for clarity. Each of the piezoelectric elements 892, 893, 894, 895 is disposed within a respective one of piezoelectric element receiving windows 864, 862, 868, 866. In the embodiment of FIG. 8, electric fields are applied to piezoelectric elements 892, 893, 894, 895 (e.g. by applying electrical potentials across conventional electrodes). Specifically, piezoelectric elements 893 and 894 are caused to contract by applied electric fields, while piezoelectric elements 892 and 895 are caused to expand by applied electric fields. Such contraction and expansion, compresses the curved compliant members 853, 857, and stretches the curved compliant members 854, 856, respectively. This causes the head 810 to rotate counter-clockwise in the view of FIG. 8.

In the embodiment of FIG. 8, applied electric fields of opposite sense would cause piezoelectric elements 893 and 894 to expand, while piezoelectric elements 892 and 895 would contract. Such expansion and contraction, would stretch the curved compliant members 853, 857, and compress the curved compliant members 854, 856, respectively. This would cause the head 810 to rotate clockwise in the view of FIG. 8.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A head gimbal assembly (HGA) comprising:
   a mounting plate configured to be attachable to an actuator arm;
   a load beam extending from the mounting plate;
   a laminated flexure including a tongue and an actuator frame, the actuator frame including a fixed portion that is attached to the tongue, and a head mounting surface that is connected to the fixed portion by first and second compliant members; the actuator frame including first and second piezoelectric element receiving windows, each adjacent a respective one of the first and second compliant members;

first and second piezoelectric elements, each being disposed within a respective one of the first and second piezoelectric element receiving windows; and a read head bonded to the head mounting surface.

2. The HGA of claim 1 wherein the first piezoelectric element defines a piezoelectric element thickness, and a mid-plane of the piezoelectric element thickness is aligned with a neutral plane of the actuator frame.

3. The HGA of claim 2 wherein the piezoelectric element thickness is greater than the laminated flexure thickness.

4. The HGA of claim 2 wherein the piezoelectric element thickness is in the range 30 microns to 150 microns.

5. The HGA of claim 2 wherein the laminated flexure thickness is in the range 18 microns to 80 microns.

6. The HGA of claim 1 wherein the head mounting tongue, the fixed portion, and the first and second compliant members are a single component having material continuity rather than being an assembly of sub-components.

7. The HGA of claim 6 wherein the head mounting tongue, the fixed portion, the head mounting platform, and the first and second compliant members are distinct regions of a contiguous stainless steel layer, each distinct region being at least partially bounded and defined by etched openings through the contiguous stainless steel layer.

8. The HGA of claim 7 wherein the etched openings include the first and second piezoelectric element receiving windows.

9. The HGA of claim 1 wherein the laminated flexure further includes a structural layer, a dielectric layer, and a conductive layer that defines a plurality of conductive traces, and wherein the read head is electrically connected to more than one of the plurality of conductive traces, and the first and second piezoelectric elements are each electrically connected to at least one of the plurality of conductive traces.

10. The HGA of claim 1 wherein each of the first and second piezoelectric elements is a laminated piezoelectric element that comprises a plurality of layers of piezoelectric material disposed between pairs of a plurality of electrically conductive electrode layers.

11. The HGA of claim 1 wherein each of the first and second piezoelectric elements comprises a piezoelectric material selected from the group consisting of lead zirconate titanate, lead scandium tantalite, lanthanum gallium silicate, lithium tantalite, barium titanate, gallium phosphate and potassium sodium tartrate.

12. The HGA of claim 1 wherein at least one edge of the first piezoelectric element is bonded by an adhesive to an edge of the actuator frame that faces into the first piezoelectric element receiving window.

13. The HGA of claim 12 wherein the adhesive is electrically non-conductive, and is selected from the group consisting of cyanoacrylates, epoxies, polyimide adhesives, and acrylic adhesives.

14. The HGA of claim 1 wherein the first and second piezoelectric elements are disposed closer to the read head than are the first and second compliant members, wherein each of the first and second piezoelectric elements has a length in the range 0.5 mm to 1.5 mm and a width in the range 150 microns to 350 microns, and wherein the first and second piezoelectric elements are separated from each other by a separation distance in the range 0.5 mm to 1.5 mm.

15. A disk drive comprising:
a disk drive base;
a spindle attached to the disk drive base;
a disk mounted on the spindle;
a first actuator pivotally attached to the disk drive base, the first actuator including a conductive coil and an actuator arm; and
a head gimbal assembly (HGA) comprising
a mounting plate attached to the actuator arm;
a load beam extending from the mounting plate;
a laminated flexure including a tongue and an actuator frame, the actuator frame including a fixed portion that is attached to the tongue, and a head mounting surface that is connected to the fixed portion by first and second compliant members; the actuator frame including first and second piezoelectric element receiving windows, each adjacent a respective one of the first and second compliant members;
first and second piezoelectric elements, each being disposed within a respective one of the first and second piezoelectric element receiving windows; and
a read head bonded to the head mounting surface and disposed adjacent a surface of the disk.

16. The disk drive of claim 15 wherein the first piezoelectric element defines a piezoelectric element thickness, and a mid-plane of the piezoelectric element thickness is aligned with a neutral plane of the actuator frame.

17. The disk drive of claim 16 wherein the piezoelectric element thickness is greater than the laminated flexure thickness.

18. The disk drive of claim 16 wherein the piezoelectric element thickness is in the range 30 microns to 150 microns.

19. The disk drive of claim 16 wherein the laminated flexure thickness is in the range 18 microns to 80 microns.

20. The disk drive of claim 15 wherein the head mounting tongue, the fixed portion, and the first and second compliant members are a single component having material continuity rather than being an assembly of sub-components.

21. The disk drive of claim 20 wherein the head mounting tongue, the fixed portion, the head mounting platform, and the first and second compliant members are distinct regions of a contiguous stainless steel layer, each distinct region being at least partially bounded and defined by etched openings through the contiguous stainless steel layer.

22. The disk drive of claim 21 wherein the etched openings include the first and second piezoelectric element receiving windows.

23. The disk drive of claim 15 wherein the laminated flexure further includes a structural layer, a dielectric layer, and a conductive layer that defines a plurality of conductive traces, and wherein the read head is electrically connected to more than one of the plurality of conductive traces, and the first and second piezoelectric elements are each electrically connected to at least one of the plurality of conductive traces.

24. The disk drive of claim 15 wherein each of the first and second piezoelectric elements is a laminated piezoelectric element that comprises a plurality of layers of piezoelectric material disposed between pairs of a plurality of electrically conductive electrode layers.

25. The disk drive of claim 15 wherein each of the first and second piezoelectric elements comprises a piezoelectric material selected from the group consisting of lead zirconate titanate, lead scandium tantalite, lanthanum gallium silicate, lithium tantalite, barium titanate, gallium phosphate and potassium sodium tartrate.

26. The disk drive of claim 15 wherein at least one edge of the first piezoelectric element is bonded by an adhesive to an edge of the actuator frame that faces into the first piezoelectric element receiving window.

27. The disk drive of claim 26 wherein the adhesive is electrically non-conductive, and is selected from the group consisting of cyanoacrylates, epoxies, polyimide adhesives, and acrylic adhesives.

28. The disk drive of claim 15 wherein the first and second piezoelectric elements are disposed closer to the read head than are the first and second compliant members, wherein each of the first and second piezoelectric elements has a length in the range 0.5 mm to 1.5 mm and a width in the range 150 microns to 350 microns, and wherein the first and second piezoelectric elements are separated from each other by a separation distance in the range 0.5 mm to 1.5 mm.

\* \* \* \* \*